United States Patent
Kim et al.

(10) Patent No.: US 11,000,758 B2
(45) Date of Patent: May 11, 2021

(54) SYSTEM AND METHOD FOR PROVIDING GAME

(71) Applicants: NHN Entertainment Corporation, Seongnam-si (KR); NHN PixelCube Corporation, Seongnam-si (KR)

(72) Inventors: Seong Hyeon Kim, Seongnam-si (KR); Eun Kyung Kim, Seongnam-si (KR); Suan Yu, Seongnam-si (KR)

(73) Assignees: NHN Entertainment Corporation, Seongnam-si (KR); NHN PixelCube Corporation, Seongnam-si (KR)

( * ) Notice: Subject to any disclaimer, the term of this patent is extended or adjusted under 35 U.S.C. 154(b) by 0 days.

(21) Appl. No.: 15/722,438

(22) Filed: Oct. 2, 2017

(65) Prior Publication Data

US 2018/0093172 A1 Apr. 5, 2018

(30) Foreign Application Priority Data

Oct. 5, 2016 (KR) .................... 10-2016-0128076

(51) Int. Cl.
*A63F 11/00* (2006.01)
*A63F 9/06* (2006.01)
(Continued)

(52) U.S. Cl.
CPC ........ *A63F 9/0612* (2013.01); *A63F 13/2145* (2014.09); *A63F 13/52* (2014.09)

(58) Field of Classification Search
CPC .......... A63F 13/00; A63F 13/10; A63F 13/32; A63F 13/42; A63F 13/52; A63F 13/56; A63F 13/80; A63F 3/02; A63F 3/00176; A63F 3/00697; A63F 3/00214; A63F 2003/00996; A63F 9/10; A63F 2011/0083; G07F 17/3262
See application file for complete search history.

(56) References Cited

U.S. PATENT DOCUMENTS 9,278,282 B2  3/2016  Knutsson et al.

FOREIGN PATENT DOCUMENTS

| JP | 2015-196082 | 11/2015 |
|----|----|----|
| JP | 2016-501043 | 1/2016 |
| KR | 10-2012-0137325 | 12/2012 |

OTHER PUBLICATIONS

Line POP2—Android / iOS Game Trailer [HD], posted Sep. 6, 2015, https://www.youtube.com/watch?v=gtwNwv0YKIQ (Year: 2015).*

(Continued)

*Primary Examiner* — Omkar A Deodhar
*Assistant Examiner* — Ross A Williams
(74) *Attorney, Agent, or Firm* — H.C. Park & Associates, PLC

(57) ABSTRACT

A method for providing a game includes: providing a plurality of blocks arranged on a block map with mission information to be displayed on a screen; selecting a block, among the plurality of blocks, based on a user's input and moving the selected block; determining whether matched blocks are adjacent to or exist around a mission block relating to mission information when some blocks, among the plurality of blocks match with a deletable form according to a movement of the block; deleting the matched blocks when the matched blocks are adjacent to or exist around the mission block; and processing the mission information for the mission block.

18 Claims, 13 Drawing Sheets

(51) Int. Cl.
*A63F 13/2145* (2014.01)
*A63F 13/52* (2014.01)

(56) References Cited

OTHER PUBLICATIONS

Candy Crush Soda Level 41 *Eat All the Chocolate* video, posted by Candy Crush Fanatic, Mar. 20, 2016, https://www.youtube.com/watch?v=qx-n4LzOBaQ (Year: 2016).*
"Hexagon Blocks" video posted by 艺游, May 10, 2015 https://www.youtube.com/watch?v=x_WsFJXGAqA (Year: 2015).*
"Multilayered Icing" dated Jun. 18, 2016 posted at https://candycrush.fandom.com/wiki/Multilayered_Icing?oldid=856588 (Year: 2016).*
"Chocolate Spawners" posted Aug. 1, 2016 at https://candycrush.fandom.com/wiki/Chocolate_Spawner?oldid=929069 (Year: 2016).*
Office Action dated Oct. 23, 2018 issued in Japanese Patent Application 2017-192615.
Tetris DS, a fully-preserved version of DS Soft All Catalog 07 SUMMER, Mainichi Communications Co., Ltd., Aug. 1, 2007, vol. 12 No. 8, p. 136-137.
"Ultra Puzzle Bobble", Famitsu Xbox, Enterbrain, Inc., Mar. 1, 2005, vol. 4, Issue 3.
"SANKE Puzzle", What is a special block for more enjoying LINE POP2?"[PR]", May 7, 2015, available at https://web.archive.org/web/20150507090518/http://www.appbank.net/2015/01/30/iphone-application/969503.php.
Naver blog, Cacao Game Puzzle Bubble Update to 285 Steps, Oct. 30, 2014, available at http://blog.naver.com/jjoo0322/220166693384 (last visited Jan. 31, 2018)—with unverified machine translation.
Never blog, Cacao Friend Game Friend Connect, Sep. 6, 2015, available at http://blog.naver.com/cowai/220473286541 (last visited Jan. 31, 2018)—with unverified machine translation.
Tstory, All About Special Blocks, Oct. 16, 2015, available at http://eggeggroll.tistory.com/229 (last visited Jan. 31, 2018)—with unverified machine translation.

* cited by examiner

SYSTEM AND METHOD FOR PROVIDING GAME

CROSS-REFERENCE TO RELATED APPLICATION

This application claims the priority benefit of Korean Patent Application No. 10-2016-0128076, filed on Oct. 5, 2016, in the Korean Intellectual Property Office, the disclosure of which is incorporated herein by reference.

BACKGROUND

Field of the Invention

The following exemplary embodiments relate to a game, and more particularly, a system and method for providing game.

Description of the Related Art

With the recent appearance of highly efficient portable devices such as a smart phone, more and more people enjoy mobile games played on these portable devices. People generally enjoy mobile games because they can be played while a user is on the move or during short windows of spare time. In other words, most mobile games that run on mobile devices are casual games such as puzzle games.

A puzzle game is a game where a user must solve a problem or find a solution using logic based on rules set by a computer. For example, a general block game proceeds in a way that when a user moves and arranges blocks so that three blocks of the same kind are successively adjacent (e.g., adjacent in a column or adjacent in a row), the three matching blocks are removed and three other blocks fill the positions of the removed blocks. This type of block game requires judgment and agility for matching blocks fast in order to acquire a high score by successively removing blocks.

The above information disclosed in this Background section is only for understanding of the background of the inventive concept, and, therefore, it may contain information that does not form the prior art.

SUMMARY

One or more exemplary embodiments provide a block game that displays a plurality of blocks arranged on a block map with mission information and processes mission information by matching blocks which are located around or adjacent to mission block for the mission information and deleting the matched blocks.

According to an exemplary embodiment, a method for providing game may include providing a plurality of blocks arranged on a block map with mission information to be displayed on a screen; selecting a block, from the plurality of blocks, based on a user's input and moving the selected block; determining whether matched blocks are adjacent to or exist around a mission block relating to the mission information when some blocks of the plurality of blocks match with a deletable form according to the movement of the block; deleting the matched blocks when the matched blocks are adjacent to or exist around the mission block; and processing the mission information for the mission block.

According to an aspect of at least one exemplary embodiment, processing the mission information may include changing a color of the mission block to the color of the matched blocks when matched blocks are deleted and reducing a mission count when the information of a color-changed mission block corresponds to the conditions included in the mission information.

Processing the mission information may further include changing the color of the color-changed mission block to the color of the mission block before the color was changed when the information of the color-changed mission block does not correspond to the conditions included in the mission information.

According to another aspect of at least one exemplary embodiment, the mission block may be configured with a change process of first to N (N is a natural number) steps and deleted when reaching to the final steps, and processing the mission information may include upgrading a change process of mission blocks that exist around the matched blocks that are deleted and reducing a mission count when the mission block of the final step is deleted by other matched blocks.

Processing the mission information may further include upgrading the change process for high priority mission block among mission blocks which are adjacent to or placed around the matched blocks.

Processing the mission information may include upgrading the change process for the mission blocks which are adjacent to the deleted mission block of the final step and moving the mission block which exists on the top of empty space where the mission block of the final step is deleted to the empty space.

According to another aspect of at least one exemplary embodiment, processing the mission information may include starting a process for processing the mission information for the mission blocks which are adjacent to the matched blocks that are deleted, and configuring the mission blocks to be displayed with a number of a mission block is counted, and to be displayed to distinguish from other mission blocks when the number of counts of a mission block is 1.

The processing the mission information may further include counting the mission block N−1 (N is a natural number) times and resetting a count of the mission block when the count of the mission block is completed.

According to another aspect of at least one exemplary embodiment, the processing the mission information may include determining whether the information of the matched blocks which are located in the mission block area, is matched to the conditions included in the mission information, and reducing the mission count by changing the color of the mission block area to the color of the matched blocks that are deleted when the information of the matched blocks corresponds to the conditions included in the mission information.

According to another aspect of at least one exemplary embodiment, further includes configuring the mission block to randomly appears between the blocks on the block map. In addition, processing the mission information may include changing the mission block to a first mission block, deleting the mission block as the other matched blocks which are adjacent to the first mission block are deleted, and configuring a block, among the plurality of blocks, to display before the mission block appears, and.

Processing the mission information may further include changing the first mission block to the mission block when the some blocks of the plurality of blocks, which are adjacent to the first mission block are not deleted, configuring to a block to display before the mission block exists when the some of the blocks which are adjacent to the changed mission block are not deleted, making the movement of the block impossible, and enabling the deletion of the block.

According to another aspect of at least one exemplary embodiment, processing the mission information may include activating the mission block when the matched blocks, which are adjacent to the mission block are deleted a preset number of times, and processing the mission blocks at an intersected position by intersecting the activated mission block with a block that is adjacent to or exists around the mission block.

Processing the mission information may include changing a color of some blocks, among the plurality of blocks, which are adjacent to or exist around the mission block at the intersected position to the same color as the color of the intersected blocks, and returning to the state before the mission block is activated.

Processing the mission information may include generating a special block by connecting the some of the plurality of blocks having the same color.

According to another aspect of at least one exemplary embodiment, the method may further include generating a special block based on a form of matched blocks when at least three or more same blocks are matched according to the movement of the block.

Generating a special block may include generating a preset special block when five or more matched blocks are combined to form a Y shape.

The method providing game may include having a special block that is configured with special effects that operate based on a direction that the special block is generated.

According to another aspect of at least one exemplary embodiment, the block map may be configured to form a plurality of rows and a plurality of columns and provides hexagonal spaces for the blocks.

According to at least one exemplary embodiment, a computer program for executing a method for providing game, wherein the method may include providing a plurality of blocks arranged on a block map with mission information to be displayed on a screen; selecting a block, among the plurality of blocks, based on a user's input and moving the selected block; determining whether matched blocks are adjacent to or exist around a mission block relating to the mission information when some blocks, among the plurality of blocks, are matched with a deletable form according to the movement of the block; deleting the matched blocks when the matched blocks are adjacent to or exist around the mission block; and processing the mission information for the mission block.

According to at least one exemplary embodiment, a server for providing game may include a processor configured with processor-executable instructions to: provide a plurality of blocks arranged on a block map with mission information to be displayed on a screen; select a block, among the plurality of blocks, based on a user's input and move the selected block; determine whether the matched blocks are adjacent to or exist around a mission block relating to the mission information when some blocks, among the plurality of blocks, are matched with a deletable form according to the movement of the block; delete the matched blocks when the matched blocks are adjacent to or exist around the mission block; and process the mission information for the mission block.

According to exemplary embodiments, a server for providing game may provide a new block game that removes matched blocks and performs mission at the same time when blocks are matched in a deletable form as a plurality of blocks arranged on a block map is provided with mission information.

Also, according to exemplary embodiments, the server for providing game may cause interest in a monotonous game and increase playfulness by providing a variety of mission.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Figure 1:
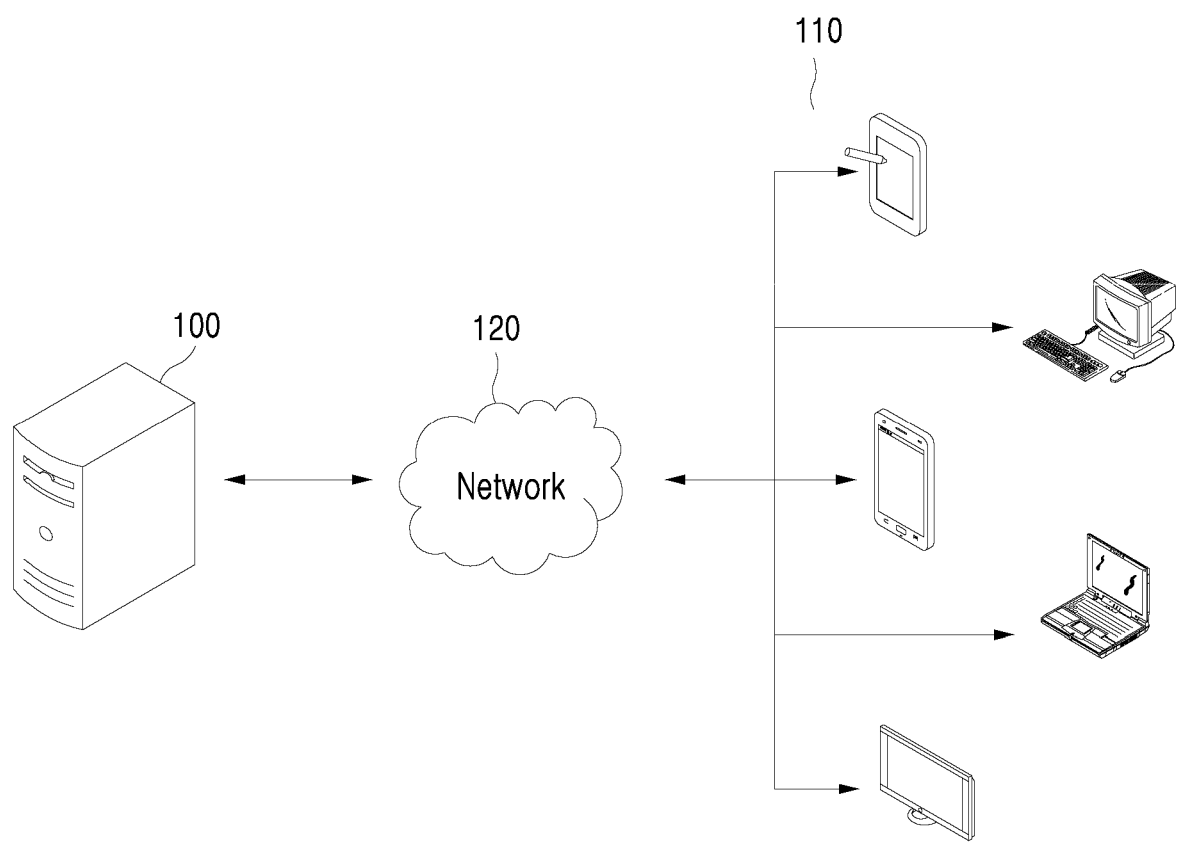
FIG. 1 illustrates an example of a network environment according to an exemplary embodiment.

FIG. 1 illustrates an example of a network environment according to an exemplary embodiment.

FIG. 1 represents an example including a terminal 110, a server 100, and a network 120. Although FIG. 1 illustrated one server and five terminals, exemplary embodiments are not limited five terminals or one server. The number of servers and terminals shown in FIG. 1 is merely exemplary.

The terminal 110 may be a fixed terminal implemented with a computer device or a mobile terminal. Examples of terminal 110 include a smart phone, a mobile phone, navigation, a computer, a laptop, a digital broadcasting terminal, a PDA (Personal Digital Assistants), a PMP (Portable Multimedia Player), a tablet PC, and the like. As an example, the terminal 110 may communicate with other terminals and/or the server 100 through the network 120 by using wireless or wired communication method.

The communication method is not limited and may include not only a communication method utilizing communication network (e.g. mobile communication network, wired Internet, wireless Internet, and broadcasting network) that the network 120 may include but also short-range wireless communication. For example, the network 120 may include any one or more network among networks of PAN (personal area network), LAN (local area network), CAN (campus area network), MAN (metropolitan area network), WAN (wide area network), BBN (broadband network), Internet, and the like. Also, the network 120 may include any one or more among network topologies including bus network, star network, ring network, mesh network, star-bus network, tree or hierarchical network, and the like, but it may not be limited thereto.

The server 100 may be implemented with a computer device or a plurality of computer devices providing an instruction, a code, a file, content, a service, and the like by communicating through the terminal 110 and the network 120. For example, the server 100 may be a server for providing game providing block game to the terminal 110 connected via the network 120.

Figure 2:
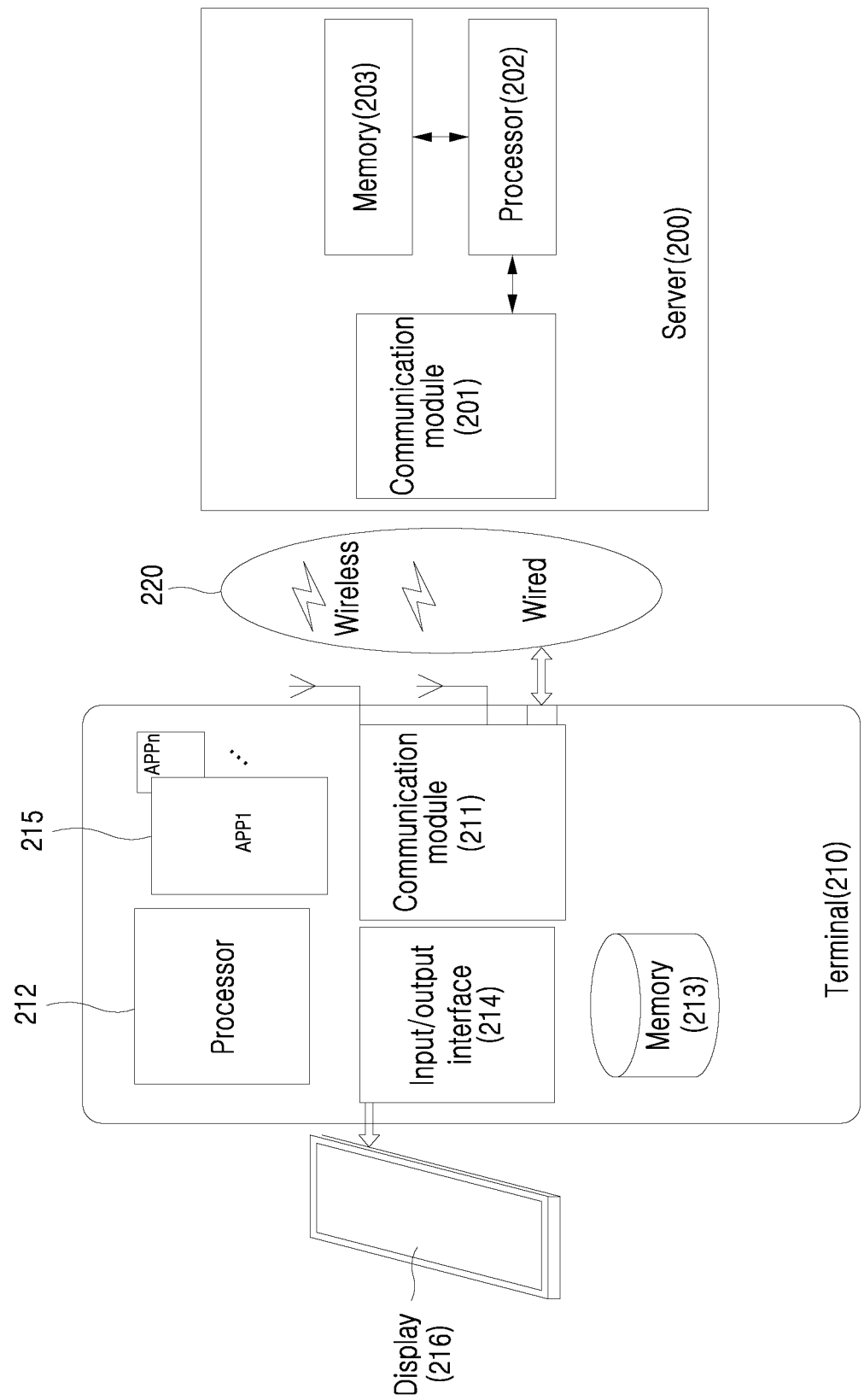
FIG. 2 is a block diagram illustrating an internal configuration of a terminal and server according to an exemplary embodiment.

FIG. 2 is a block diagram illustrating an internal configuration of a terminal and server according to an exemplary embodiment.

FIG. 2 describes an internal configuration of a terminal 210 and a server 200. For example, the terminal 210 may include a communication module 211, a processor 212, a memory 213, and an input/output interface 214. The terminal 210 may include at least one or more applications 215 working on the processor 212 and the terminal 210.

The server 200 may include a memory 203, a processor 202, and a communication module 201. The memories 203, 213 which are computer-readable storage medium may include a permanent mass storage device such as RAM (random access memory), ROM (read only memory), and a disc drive. Also, the memories 203, 213 may store OS (Operating System) or at least one program code (e.g. a browser installed and operated on the terminal 110 or a code for the described application, and the like). The software components may be loaded from other computer-readable storage medium separate from the memories 203, 213. The other computer-readable storage medium may include a floppy disc, a disc, a tape, a DVD/CD-ROM drive, a memory card, and the like. In other exemplary embodiments, the software components may be loaded onto the memories 203, 213 through the communication modules 201, 211 instead of the computer-readable storage medium. For example, at least one program may be loaded to the memories 203, 213 based a program (e.g. the described application) which is installed by files that developers or file distributing systems distributing installation files (e.g. the described server 200) provide through the network 220.

The processors 202, 212 may be configured to process instructions of computer program by performing basic arithmetic, logic, and input/output operation. The instructions may be provided to the processors 202, 212 by the memories 203, 213 or the communication modules 201, 211. For example, the processors 202, 212 may be configured to execute the instructions received in accordance with program code stored in the storage device such as the memories 203, 213.

The communication modules 201, 211 may allow the terminal 210 and the server 200 to communicate via the network 220. The communication modules 201, 211 may also allow the terminal 210 and the server 200 to communicate with other clients or other servers. For example, a request for the processor 212 of the terminal 200 to generate something according to a program code stored in memory 213 may be transmitted to the server 200 through the network 220 according to the control of the communication module 211. Conversely, a communication module 211 of the terminal 210 may receive, via the network 220, a control signal, an instruction, content, a file, and the like from communication module 201 of the server 200. The processor 202 of the server 200 may generate or provide the control signal, the instruction, content, the file, and the like to the communication module 201 of the server. For example, the control signal or instruction, and the like of the server 200 received through the communication module 211 may be transmitted to the processor 212 or the memory 213, and content or file, and the like may be stored in the storage medium that the terminal 210 may further include.

The input/output interface 214 may be a means for interfacing with an input/output device. For example, an input device may include a keyboard, a mouse, etc., and an output device may include a device such as a display for displaying a communication session of an application. As another example, the input/output interface 214 may be a means for interfacing with a device in which an input function and an output function are integrated into a single function such as a touch screen. As more a specific example, when processing instructions of the computer program loaded to the memory 213, the processor 212 of the terminal 210 may display a service screen or content configured using data provided by the server 200 or another terminal on the display 216 through the input/output interface 214.

Also, in other exemplary embodiments, the terminal 210 and the server 200 may include more components than the components of FIG. 2. However, there is no need to clearly illustrate most conventional components. For example, the terminal 210 may be implemented to include at least part of the input/output device or further include other components such as a transceiver, a GPS (Global Positioning System) module, a camera, various sensors, a database, and the like.

Figure 3:
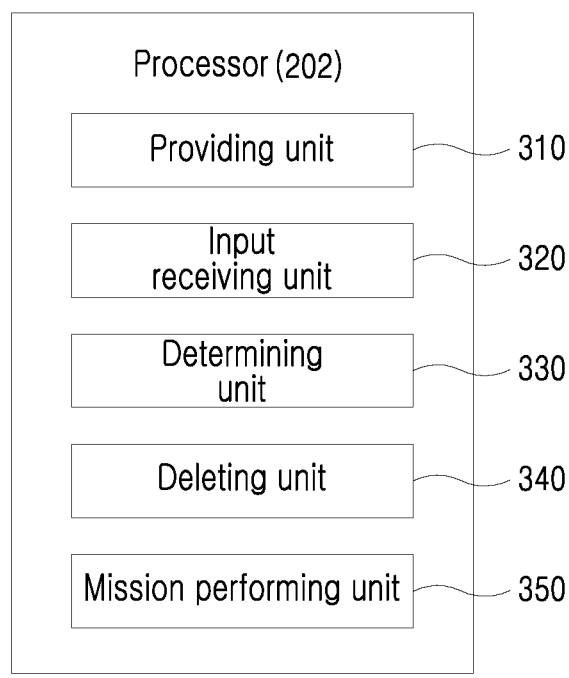
FIG. 3 illustrates an example of components included in a processor of a server for providing game according to an exemplary embodiment.
Figure 4:
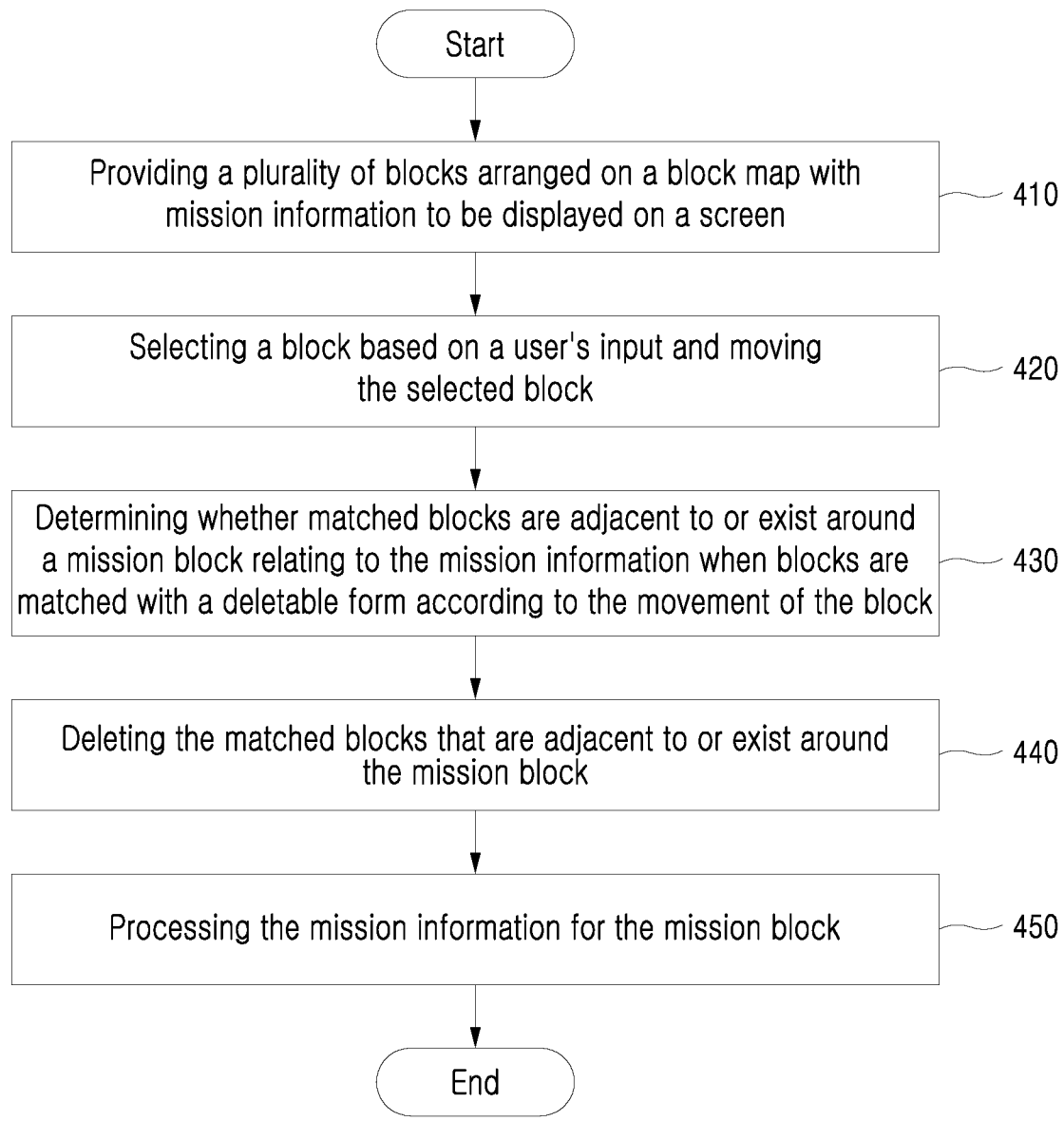
FIG. 4 is a flow chart illustrating a method for providing game of a server according to an exemplary embodiment.

FIG. 3 illustrates an example of components included in a processor of a server for providing game according to an exemplary embodiment. FIG. 4 is a flow chart illustrating a method for providing game of a server according to an exemplary embodiment.

The processor 202 which is included in the server for providing a game may include a providing unit 310, an input receiving unit 320, a determining unit 330, a deleting unit 340, and a mission performing unit 350. The processor 202 and the components of the processor 202 may control the server for providing a game to perform operations 5410 to 5450 included in the method for providing game of FIG. 4. Here, the processor 202 and the components of the processor 202 may execute instructions according to OS code included in the memory and at least one program code. Here, the components of the processor 202 may be expressions of different functions performed by the processor 202 according to control instructions provided by the program code stored in the server for providing game.

In operation 410, the providing unit 310 may provide a plurality of blocks arranged on a block map with mission information to be displayed on a screen.

In operation 420, the input receiving unit 320 may select a block based on a user's input and move the selected block. Here, the user may move the block by selecting and dragging the block.

In operation 430, the determining unit 330 may determine whether matched blocks are adjacent to or exist around a mission block relating to the mission information when blocks are matched with a deletable form according to the movement of the block.

Also, a special block generating unit (not illustrated) may be included. The special block generating unit may generate, based on the form of matched block, a special block when at least three blocks are matched back on a block movement. The special block generating unit generates the special block having different special effects based on the form of the matched blocks. The special block generating unit may generate a preset special block when the matched blocks are matched in combinations of five or more and make a form of Y.

In operation 440, the deleting unit 340 may delete the matched blocks that are adjacent to or exist around the mission block.

In operation 450, the mission performing unit 350 may process the mission information for the mission block. For example, the mission performing unit 350 may delete the matched blocks to process the mission information, and process the mission when the information of the deleted blocks corresponds to the conditions included in the mission information. The exemplary embodiments of a method for performing mission will be described in FIGS. 6 to 12.

Figure 5:
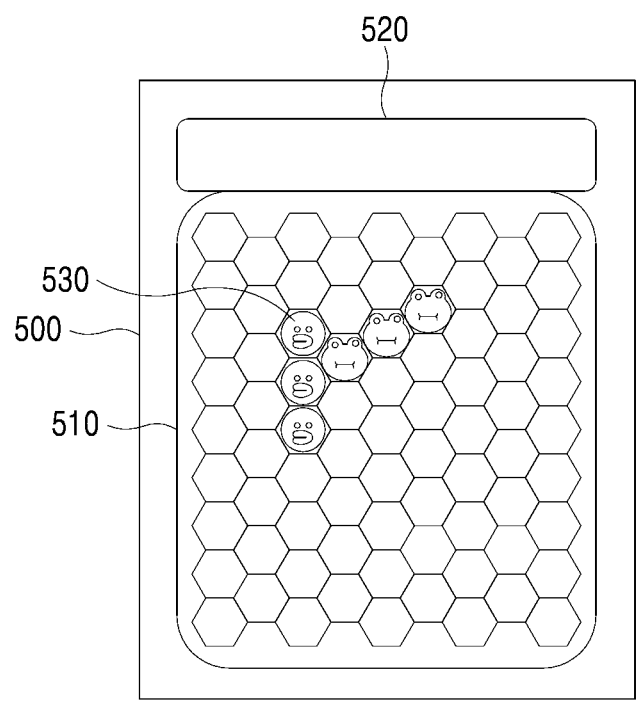
FIG. 5 illustrates an example of a game screen according to an exemplary embodiment.

FIG. 5 illustrates an example of a game screen according to an exemplary embodiment.

The server for providing a game may display a plurality of blocks arranged on a block map 510 with mission information 520 on a game screen 500. The block map 510 may be configured to form a plurality of rows and a plurality of columns, and arrange the plurality of blocks 530 in a hexagonal shape. Here, the block map 510 may be displayed on the game screen 500 by randomly including mission blocks for mission information and may be displayed on the game screen by generating a special map for the mission information and storing the special map as the block map.

A user may remove the blocks 530 and process the mission by moving the blocks in a hexagonal shape displayed on the game screen 500 in line and vertical direction (e.g. 6 directions of up, down, top left, bottom left, top right, and bottom right) based on user's touch and drag. For example, the blocks 530 displayed on the screen 500 may be comprised with a plurality of different types distinguished by shape, color, and the like. The blocks 530 may be determined the moved distance based on information for a touched position for a touch and drag event recognized through a touch screen from the user and information for dragged direction for the touch and drag event. Here, the blocks 530 may be deleted as at least three or more identical blocks are adjacent. Also, the special block may be generated based on the form in which the adjacent blocks are matched.

FIGS. 6 to 12 illustrate an example of describing a method for processing mission information in a server for providing a game according to an exemplary embodiment.

The server for providing a game may provide a block game including various missions.

Figure 6:
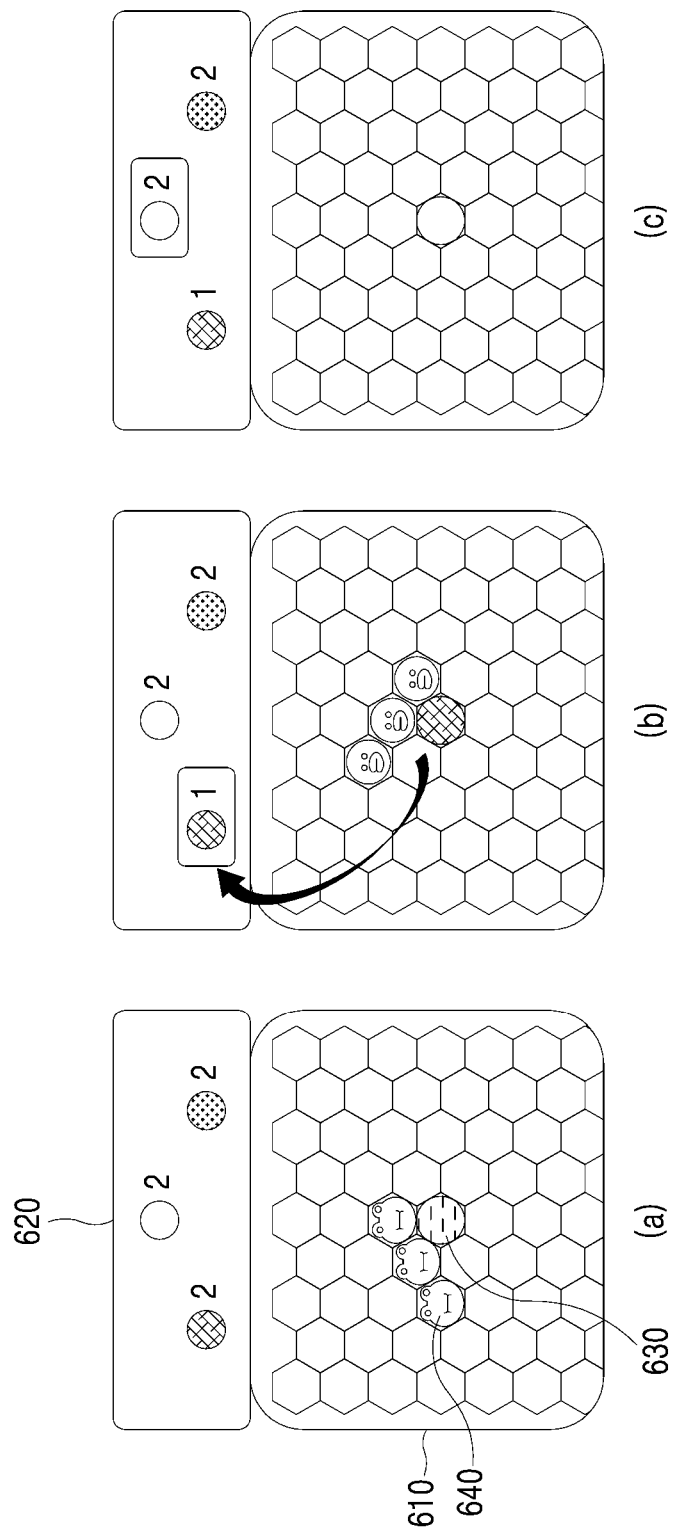
FIG. 6, FIG. 7, FIG. 8, FIG. 9, FIG. 10, FIG. 11, and FIG. 12 illustrate an example of describing a method for processing mission information in a server for providing a game according to an exemplary embodiment.

FIG. 6, corresponds to a first mission (mission for 'making a cake'). Referring to FIG. 6, the server for providing the game may provide blocks 640 and a mission block 630 together to a block map 610. The server may also provide mission information 620 including mission. Here, the server may provide a block map area that arranges and displays the blocks on a screen and a mission information area displaying the mission information 620. The server may provide differently UI types indicating the mission information based on a number of missions. For example, the mission information 620 displayed in the mission information area may arrange the mission block differently according to a number of missions.

The first mission is involves deleting a block in a form of bowl, which is a mission block as a preset number. For example, it may be the mission to delete two green mission blocks, two yellow mission blocks, and two red mission blocks. Here, the mission block (the block in a form of bowl) may change color to that of a deleted block when blocks which are adjacent to or exist around the mission blocks are deleted. The mission block may change to a block in a form of cake relating to the colors of the deleted blocks.

Referring to (a) and (b) of FIG. 6, the server for providing a game may determine whether matched blocks are adjacent to or exist around the mission block when blocks are matched with a deletable form. The server may delete matched blocks 640 and change the color of the mission block 630 to the colors of the deleted blocks when the mission block 630 is adjacent to or exists around the matched blocks 640. Here, mission count may be reduced when the information of the color changed block corresponds to the conditions included in the mission information. For example, when deleting the matched blocks (e.g. green color blocks) adjacent to the mission block, the mission block may be change to the block in a form of cake. Here, among the mission information, as the color information of the changed mission block corresponds to the condition of deleting two green color mission blocks, the server may deduct 1 green mission block displayed in the mission information area.

Referring to (c) of FIG. 6, the server for providing a game may change the color of the color changed mission block to the color of the mission block before the color is changed when the information of the color changed mission block does not correspond to the conditions included in the mission information.

Figure 7:
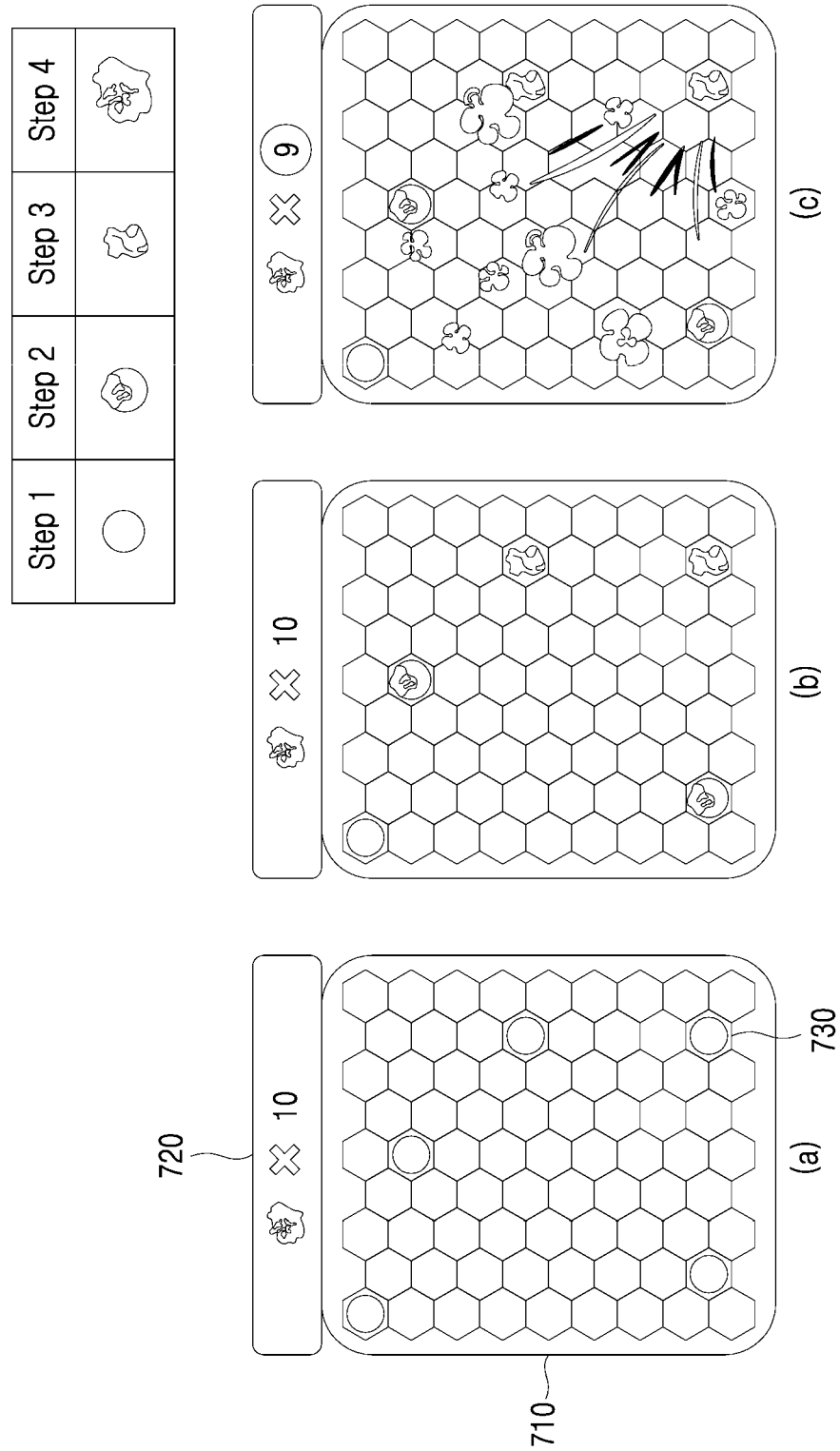
Figure 8:
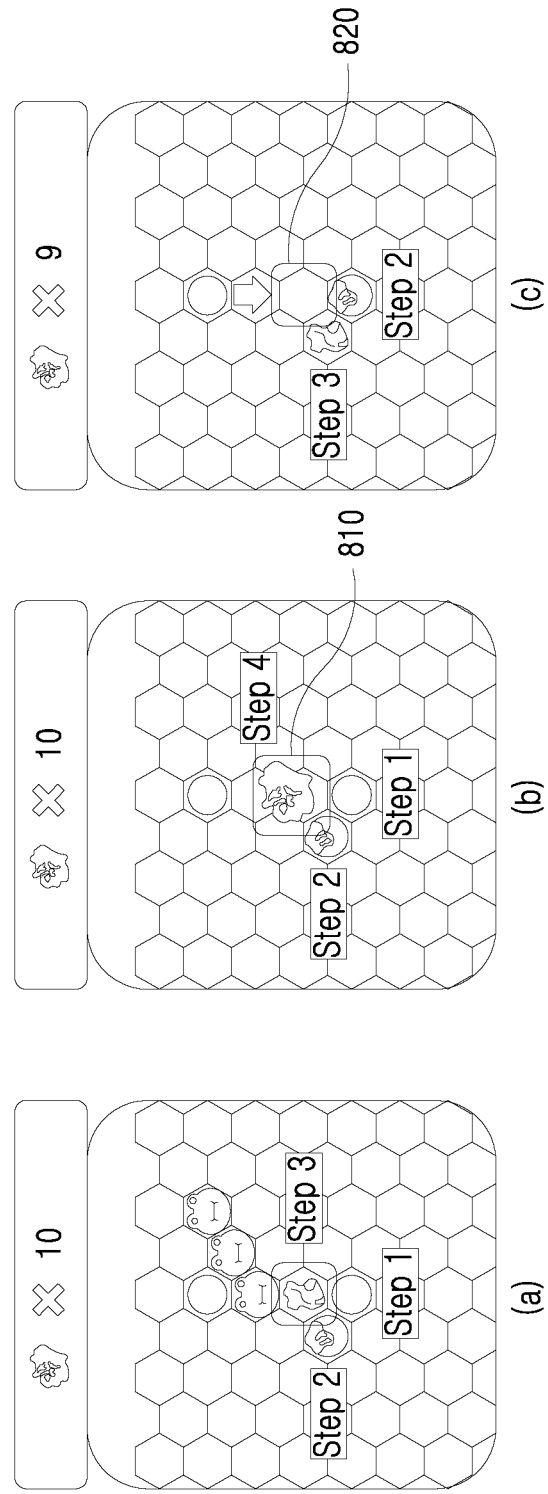

FIGS. 7 and 8 refer to a game method for a second mission (mission for 'making popcorn'). The second mission is that a mission block 730 processes the mission through steps for a preset change process when blocks are adjacent to or exist around the mission block 730. The mission block 730 is provided based on the mission information 720 and the block map 710.

Here, the mission block may be configured with first to N (N is a natural number) steps and may be deleted when reaching the final step. The change process of the mission block 730 for each of steps may be displayed differently. For example, the mission block is configured with steps 1 to 4 in FIGS. 7 and 8.

Referring to (a) to (c) of FIG. 7, the server for providing a game may delete the matched blocks as the matched blocks are adjacent to or exist around the mission blocks 730. The server may upgrade the mission blocks 730 that exist around the deleted blocks. For example, a mission block of step 1 may be upgraded to a mission block of step 2, and the mission block of the step 2 may be upgraded to a mission block of step 3.

As the mission block is upgraded, the final step may be reached, and mission count for mission information may be reduced when the mission block is deleted by other matched blocks which are adjacent to or exist around the mission block of the final step. For example, in FIG. 7, the final step of the mission block may be step 4, and the mission is performed by bursting the mission block that reaches step 4.

Referring to (a) and (b) of FIG. 8, the server for providing a game may upgrade a high priority mission block 810 among mission blocks when there is a plurality of mission blocks which is adjacent to or exists around to matched blocks. Here, when there is a plurality of mission blocks which is adjacent to or exists around the matched blocks, the mission blocks existing below the matched blocks may be upgraded.

Referring to (c) of FIG. 8, the server for providing a game may upgrade the adjacent mission blocks as the mission block of the final step is deleted. The server may move the mission block which exists on the top of empty space 820 corresponding to where the mission block was deleted. Here, blocks, other than the mission block, which exists on the top of the empty space formally occupied by the mission block may be moved to the empty space.

Figure 9:
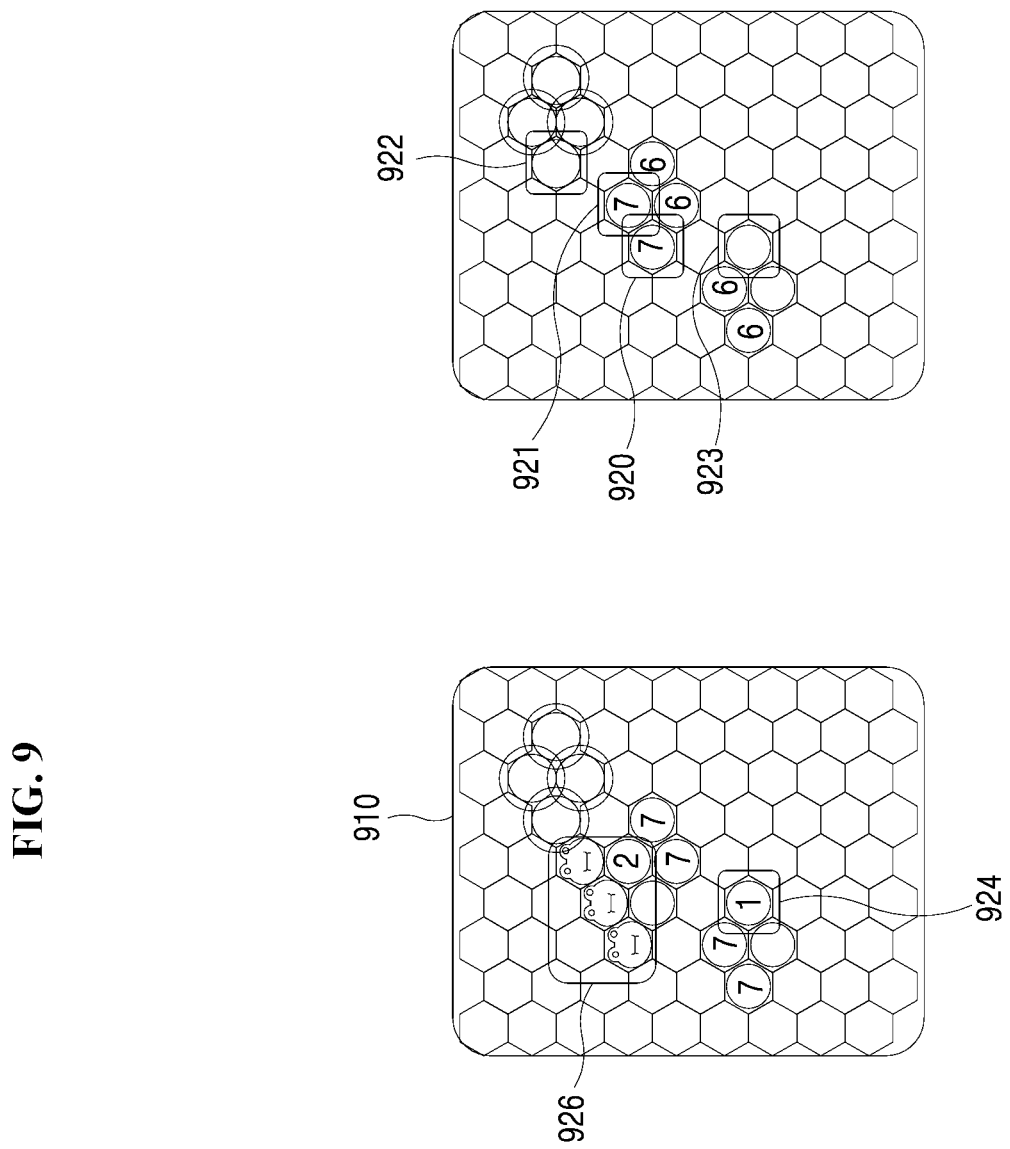

FIG. 9 illustrate a game method for a third mission (mission for 'turning on bulb').

The third mission involves processing mission information that is started by deleting matched blocks 926 that are adjacent to mission blocks as mission blocks 920, 921, 922, 923, 924. The mission blocks 920, 921, 922, 923, 924 relate to the mission information and are provided to a block map 910. The mission proceeds until the mission is completed. For example, in the third mission, the mission block may be provided in a form of bulb covered with jelly. The mission block, in a form of bulb, may be turned on and off. Here, when starting the mission process, the mission block may have numbers placed over the jelly covered bulb. These numbers may change when the matched blocks which are adjacent to the mission 921 block in a form of bulb are deleted.

The server for providing a game may process the mission information for the mission blocks when matched blocks adjacent to mission blocks are deleted. For example, the mission block 920 containing bulb covered with jelly may be changed to a mission block having a bulb turned on when blocks adjacent to the mission block 920 are matched and are removed. Here, the mission block (the block in a form of bulb) may be moved by conveyor belt and not deleted. Also, the mission block is displayed with a number corresponding to the stage of the mission. The number may be displayed separately to distinguish from other mission blocks in a form of bulbs when the number of counts of the mission block is 1 such as mission block 924. For example, the server may display the color of mission block that have a number or count of 1 differently than other mission blocks.

When the matched blocks, adjacent to the mission block, are deleted, the mission information for the mission block may be changed. Specifically, the server for providing a game may process mission information such that a mission block can be counted N−1 (N is a natural number) number of times. The server may reset the count of the mission block when the count of the mission block is exhausted 921. For example, a number of counts may be displayed on the mission block (in the form of a bulb). Each time the count of the mission block is subtracted, the light of the bulb may be turned off when the count of the block in a form of bulb is exhausted. Also, the count of the mission block may be reset and the light of the block may be turned on.

Figure 10:
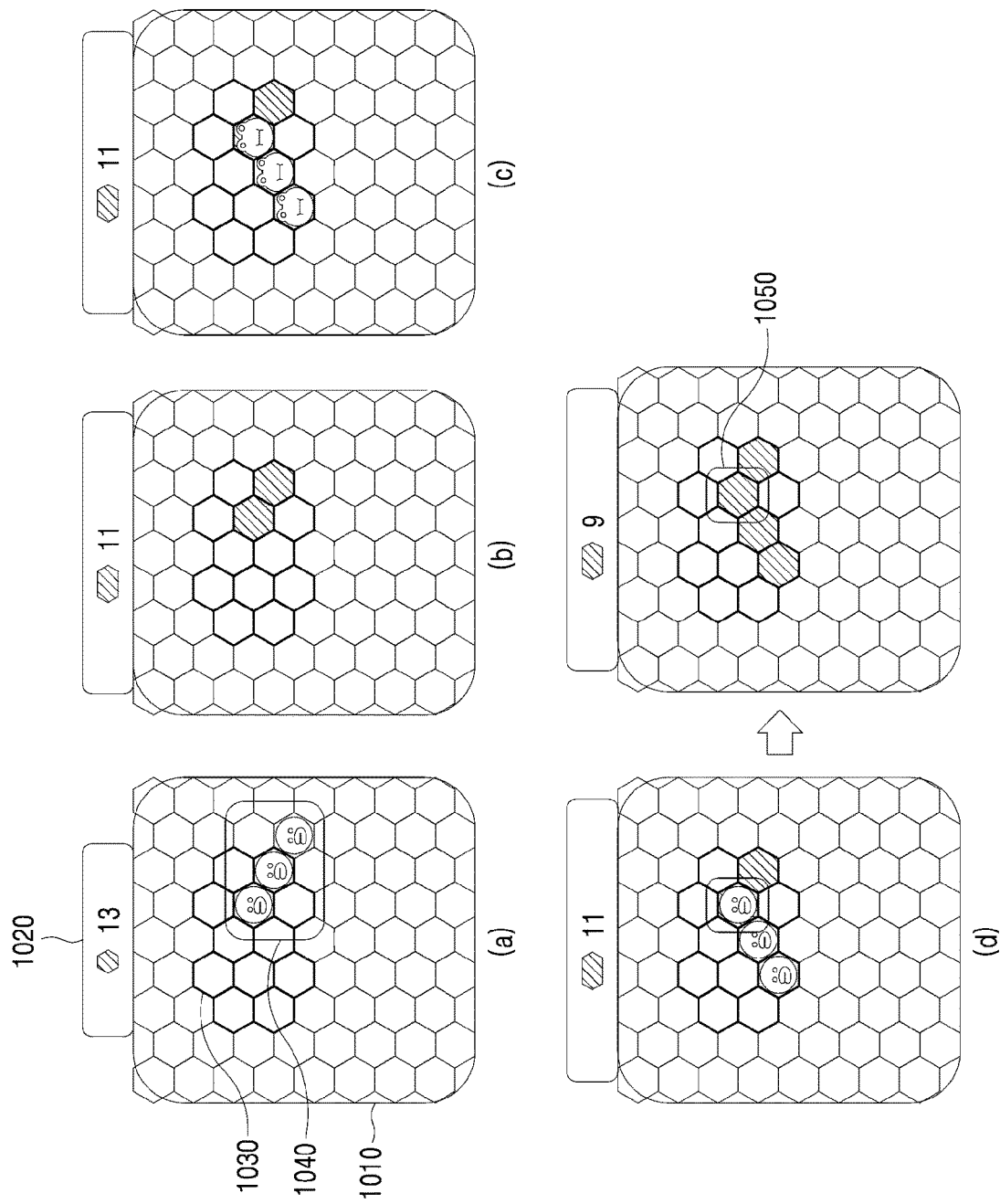

FIG. 10 refers to a game method for a fourth mission (mission for 'making color cream'). The fourth mission is filling color of a mission block area by matching a block having the same color of the mission block area in the mission block area as the mission block area 1030 relating to mission information 1020 is provided to a block map 1010.

For example, the server for providing a game may provide the mission block area (the white block area) 1030 to a part of the block map 1010. The mission information 1020 may fill the white block area with thirteen yellow blocks. Here, the size and shape of the mission block area provided in the block map 1010 may be determined based on the mission information.

Referring to (a) of FIG. 10, blocks 1040 may be matched and located in the mission block area 1030. The server for providing a game may determine whether the matched blocks 1040 corresponds to the mission information. For example, the server may determine that the yellow blocks correspond to conditions included in the mission information as the yellow blocks are located in the mission block area 1030.

Referring to (b) of FIG. 10, the server for providing a game may delete the matched blocks and change the color of the mission block area 1030 at the position of the deleted blocks to yellow at the same time. The server may reduce the mission count to correspond to the number of the color changed mission block areas. For example, as the color of the mission block area is changed, thirteen yellow mission blocks may be changed to filling the eleven yellow mission blocks in real time.

Here, referring to (c) of FIG. 10, the server for providing a game deletes the matched blocks but does not change the color of the mission block area and does not reduce the mission count when the matched blocks 1040 do not correspond to the conditions (e.g., matching ducks) included in the mission information are not met.

Also, referring to (d) of FIG. 10, even if the matched blocks 1040 correspond to the conditions included in the mission information (e.g., matching ducks), the color of a part of the mission block area may be already changed. In other words, when the mission block area where the color has already changed is overlapped with the area where the matched blocks are located, the server for providing a game may change the color of the remaining mission block area except the overlapped mission block area. Here, the server may exclude the overlapped mission block area 1040 from the count.

Figure 11:
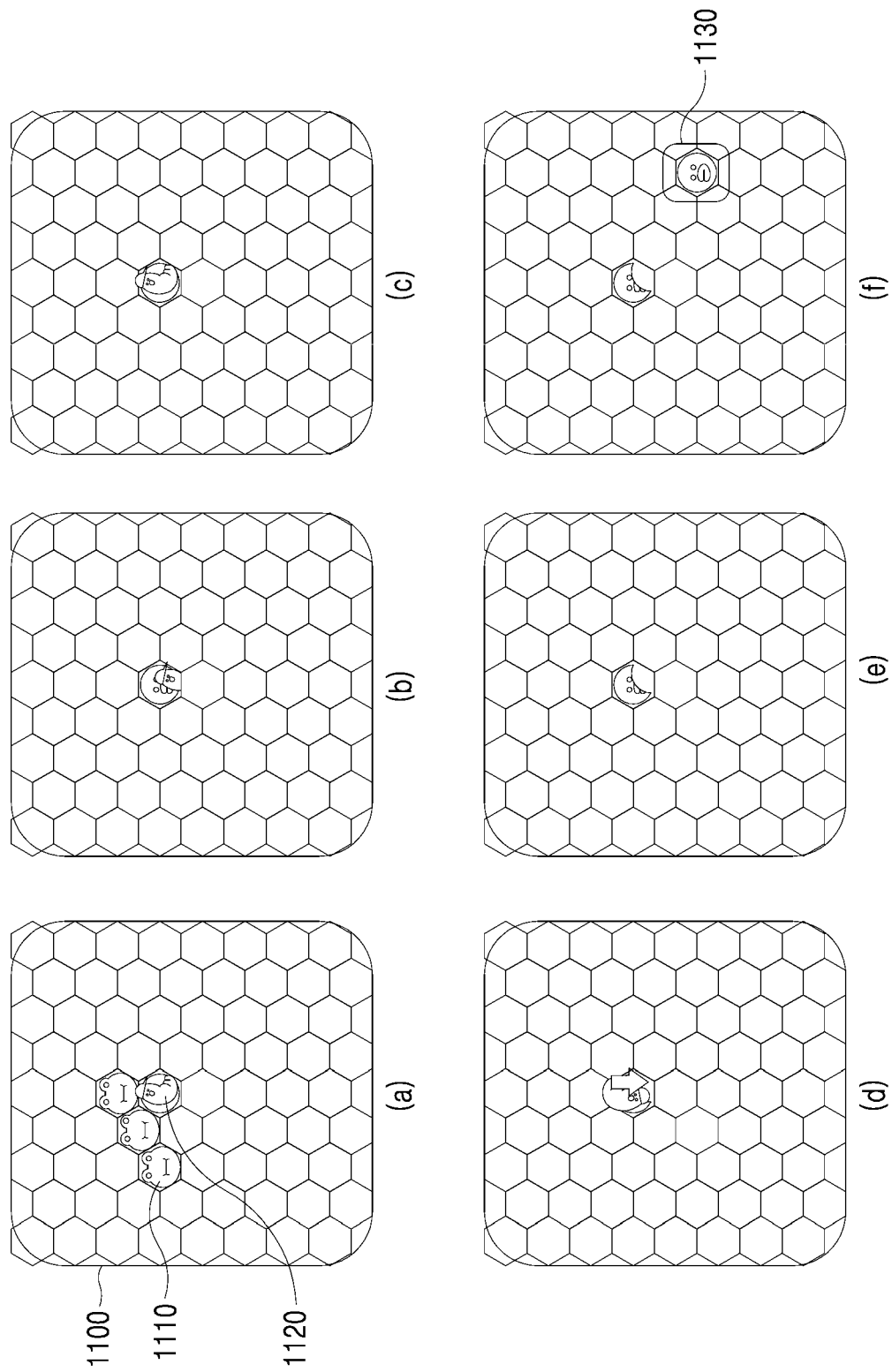

FIG. 11 refers to a game method for a fifth mission (mission for 'capturing Edward'). In the fifth mission, matched blocks 1110 adjacent to the mission block 1120 are deleted, but the mission block 1120 goes through preset changes. Here, the mission block 1020 of the fifth mission may randomly appear in the range of the block map 1100. For example, the mission block starts to include a worm, Edward, that appears starting from the bottom of the block. The mission block appears to get eaten by the worm. Here the worm may be regarded as Edward.

Referring to (a) and (b) of FIG. 11, the server for providing a game may change the mission block to a first mission block as the matched blocks 1110 which are adjacent to the mission block 1120 are deleted. The server may delete the mission block as other matched blocks which are adjacent to the first mission block are deleted. For example, the first mission block may be a block that Edward hides in a hat. As the other matched blocks which are adjacent to the first mission block 1120 are deleted, Edward may be captured and the block before Edward appears may be displayed.

As (c) to (e) of FIG. 11, the server for providing a game may change the first mission block to the mission block when the blocks which are adjacent to the first mission block may not be deleted (c). Here, the mission block may disappear when the blocks which are adjacent to the changed mission block may not be deleted (d). Then, the server may display the block before the mission block appears, the block before the mission block appears may make the movement of the block impossible and enable only to delete the block (e). For example, when the server for providing game may not delete the blocks which are adjacent to Edward hidden in the hat, Edward may reappear in the hat (c). Here, when the blocks which are adjacent to Edward are deleted, Edward may hide in the hat again. Also, when the blocks which are adjacent to Edward that reappears in the hat may not be deleted, Edward may disappear (d). When Edward disappears, the existing block before Edward appears may appear €, and the block before Edward appears may not be moved and may only be deleted. Here, the block before the mission block appears may be deleted when it is matched in a deletable form with blocks having the same form as the previous block.

Referring to (f) of FIG. 11, the server for providing a game may move the disappeared mission block to the same position or different position based on a random value calculated based on the size and position of the block map 1110. Accordingly, the mission block may randomly appear between the blocks on the block map.

Figure 12:
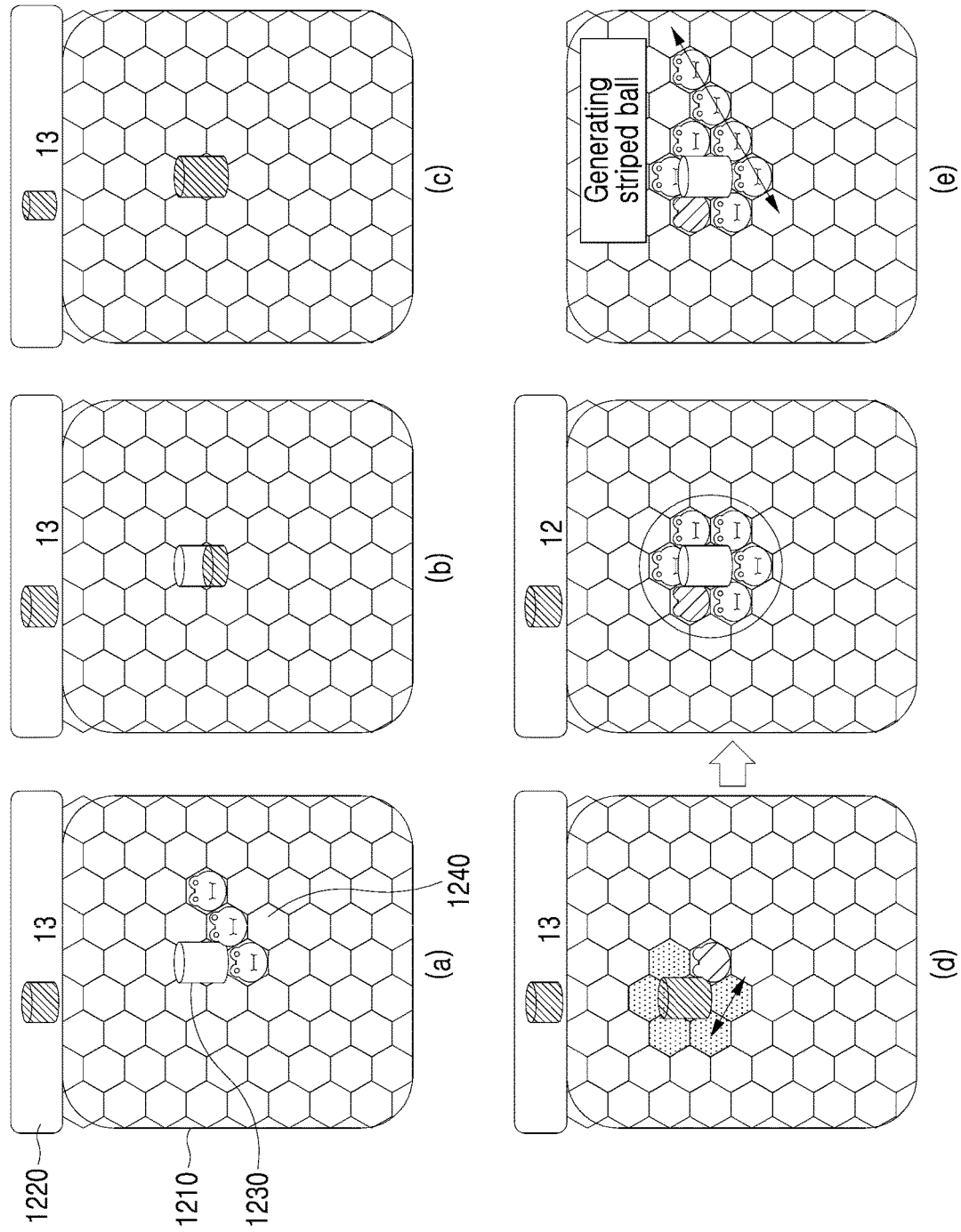

FIG. 12 refers to a game method for a sixth mission (mission for 'popping champagne'). In the sixth mission, when matched blocks 1240 are adjacent to a mission block as the mission block 1230, relating to mission information 1220, is provided to a block map 1210, the matched blocks are deleted and the mission block 1230 activates the mission block 1230 and processes the mission by going through a preset change process. The mission block 1230 is a block in a form of a champagne bottle in the sixth mission.

Referring to (a) to (c) of FIG. 12, the server for providing a game may activate the mission block 1230 by deleting matched blocks 1240 which are adjacent to the mission block 1230 as a preset number of times or more. As more detailed, the server may the matched blocks 1240, which are adjacent to the mission block 1230, and may change the mission block 1230 when the matched blocks 1240 are deleted.

Here, as the blocks which are adjacent to the mission blocks 1230 are deleted more than the preset number of times, the mission block 1230 may be activated. Here, a number of times for activating the mission block 1230 may be set in advance. For example, when deleting the matched blocks which are adjacent to or exist around the champagne bottle, bubbles of the champagne bottle may increase. Here, the champagne bottle may be activated when the matched blocks which are adjacent to or exist around the champagne bottle burst for more than the preset number of times.

Referring to (d) of FIG. 12, the server for providing a game may process the mission block at an intersected position by intersecting the activated mission block with the block which is adjacent to or exists around the mission block. The server may reduce mission count for the mission information. Here, when the activated mission block and a special block are intersected, the special block and blocks, which are adjacent to the special block, may be deleted based on process effect of the special block. For example, the special block and the blocks, which are adjacent to the special block, may be intersected with the block, which is adjacent to or exists around the activated champagne bottle, the champagne bottle is popped at the intersected position, and the blocks which are adjacent to the champagne bottle may be change to a general block relating the intersected block at the intersected position.

The server for providing a game may change the color of the blocks which are adjacent to or exist around the mission block to the same color as the color of the intersected blocks, and the mission block may return to the state before the mission block is activated. For example, bubbles in the same color as the color of the intersected block may emerge from the champagne bottle and change the color of the blocks which are adjacent to or exist around the champagne bottle to the color of the intersected block. The champagne bottle that the bubbles emerged may return to the original state.

As (e) of FIG. 12, the adjacent blocks which are changed to the same color may be connected, and generated as the special block. Here, the special block may appear in various forms depending on each function.

Figure 13:
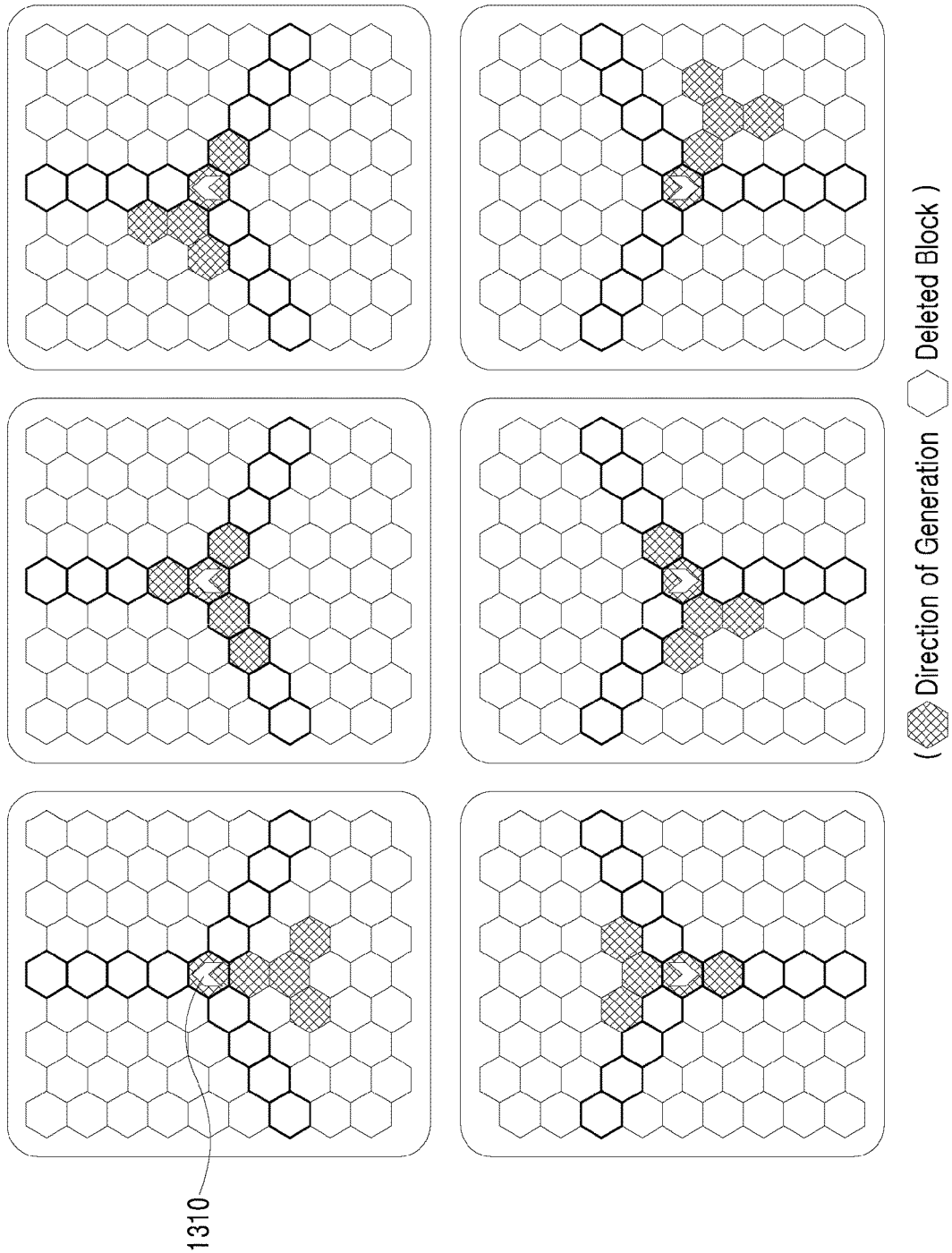
FIG. 13 illustrates an example of describing a method for generating a special block in a server for providing a game according to an exemplary embodiment.

FIG. 13 illustrates an example of describing a method for generating a special block in a server for providing a game.

The server for providing game may generate the special block based on a form of matched blocks when at least three or more same blocks are matched. For example, the special block may be generated at a position of a block joined last matched blocks according to a user's input.

Referring to FIG. 13, when five or more matched blocks are combined to form of Y, a preset special block may be generated. In FIG. 13, the form of Y is named a form of an elephant's trunk

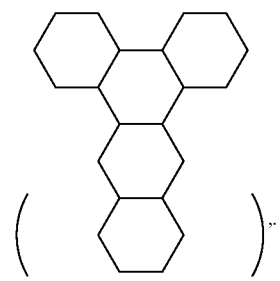

Here, when combining in the form of an elephant's trunk, a special block 1310 for an 'elephant ball' may be generated.

The special block 'elephant ball' may be made in 6 directions and the special block 1310 may be generated at a position of the finally moved block. The special block

may create special effects in two different directions based on the direction that the special block is generated. Here, the special block may indicate the direction of generation. As shown in FIG. 13, the server for providing a game may delete blocks that form the Y based on the direction that the elephant ball is generated.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method for providing a game, comprising:
providing a plurality of blocks arranged on a block map in a block area to be displayed on a screen, the plurality of blocks including mission blocks that change appearance a plurality of times during processing of mission information a plurality of times to complete a mission;
providing the mission information in a mission information area to be displayed on the screen;
selecting a block, among the plurality of blocks, based on a user's input and moving the selected block;
determining whether matched blocks are adjacent to or exist around one of the mission blocks relating to the mission information when some blocks, among the plurality of blocks match with a deletable form according to the movement of the block;
deleting the matched blocks, the matched blocks being directly adjacent to the mission block; and
processing the mission information for the mission block being directly adjacent to the deleted matched blocks in response to the deletion of the matched blocks,
wherein processing the mission information comprises:
changing a color of the mission block to a color of the matched blocks when the matched blocks are deleted, and
reducing a mission count when the color of the color-changed mission block corresponds to a color included in the mission information.

2. The method of claim 1, wherein the processing the mission information further comprises:
changing the color of the color-changed mission block to the color of the mission block before the color was changed when the information of the color-changed mission block does not correspond to the conditions included in the mission information.

3. The method of claim 1, wherein each mission block is configured to change in a change process of first to N steps, where N is a natural number, and be deleted after reaching a final step, and
processing the mission information comprises:
incrementing one step in the change process of any mission blocks that exist around the matched blocks that are deleted, and
reducing a mission count when one of the mission blocks with a change process at the final step is deleted by other matched blocks.

4. The method of claim 3, wherein processing the mission information further comprises incrementing one further change process for a high priority mission block among mission blocks which are adjacent to or placed around the matched blocks.

5. The method of claim 3, wherein processing the mission information comprises incrementing one step in the change process for the mission blocks which are adjacent to the deleted mission block and moving any mission block which exists above an empty space where the deleted mission block is deleted downward into the empty space.

6. The method of claim 1, wherein processing the mission information comprises:

starting a process for processing the mission information for the mission blocks which are adjacent to the matched blocks that are deleted, and configuring the mission blocks to be displayed with a number of times a mission block is counted, and to be displayed to distinguish from other mission blocks when a number of counts of a mission block is 1.

7. The method of claim 6, wherein the processing the mission information further comprises counting the mission block N−1 times, where N is a natural number, and resetting a count of the mission block when the count of the mission block is completed.

8. The method of claim 1, wherein the mission information includes a count of colored mission block areas and the processing the mission information comprises:

determining whether the color of the matched blocks is matched to a color included in the mission information and at least one of the matched blocks is located in the mission block area, and reducing a mission count of the colored mission block areas in the mission information based on the number of mission block areas of the matched color in response to deleting the matched blocks and changing a color of mission block areas where the at least one of the matched blocks is located to the matched color.

9. The method of claim 1, wherein a random mission block is further configured to randomly appear to be displayed in place of a first block on the block map, wherein the processing of the mission information comprises changing the random mission block to a first mission block, deleting the first mission block when other matched blocks which are adjacent to the first mission block are deleted, and displaying the first block which had been displayed before the random mission block appeared instead of an empty space upon deletion of the first mission block.

10. The method of claim 1, wherein the processing the mission information comprises activating the mission block when the matched blocks, which are adjacent to the mission block, are deleted a preset number of times, and processing the mission block at an intersected position by interchanging the activated mission block with a block that is adjacent to or exists around the mission block.

11. The method of claim 10, wherein the processing the mission information comprises changing a color of some blocks among the plurality of blocks which are adjacent to or exist around the mission block at an intersected position to the same color as a color of the intersected blocks.

12. The method of claim 11, wherein processing the mission information comprises generating a special block by connecting some of the plurality of blocks having the same color.

13. The method of claim 1 further comprising generating a special block based on a form of matched blocks when at least three or more same blocks are matched according to movement of the block.

14. The method of claim 13, wherein generating the special block comprises generating a preset special block when five or more matched blocks are combined in the form of a Y shape.

15. The method of claim 14, wherein the special block is configured with special effects that operate based on a direction that the special block is generated.

16. The method of claim 1, wherein the block map is configured to form a plurality of rows and a plurality of columns and provides hexagonal spaces for the blocks.

17. A computer program for executing a method for providing a game, wherein the method comprises:

providing a plurality of blocks arranged on a block map in a block area to be displayed on a screen, the plurality of blocks including mission blocks that change appearance a plurality of times during processing of mission information a plurality of times to complete a mission;

providing the mission information in a mission information area to be displayed on the screen;

selecting a block, among the plurality of blocks, based on a user's input and moving the selected block;

determining whether matched blocks are adjacent to or exist around one of the mission blocks relating to the mission information when some blocks, among the plurality of blocks, are matched with a deletable form according to a movement of the block;

deleting the matched blocks when the matched blocks are directly adjacent to the mission block; and processing the mission information for the mission block, wherein processing the mission information comprises:

changing a color of the mission block to a color of the matched blocks when the matched blocks are deleted, and reducing a mission count when the color of the color-changed mission block corresponds to a color included in the mission information.

18. A server for providing game, comprising:

a processor configured with processor-executable instructions to:

provide a plurality of blocks arranged on a block map in a block area to be displayed on a screen, the plurality of blocks including mission blocks that change appearance a plurality of times during processing of mission information a plurality of times to complete a mission;

provide the mission information in a mission information area to be displayed on the screen;

select a block, among the plurality of blocks, based on a user's input and move the selected block;

determine whether the matched blocks are adjacent to or exist around one of the mission blocks relating to the mission information when some blocks, among the plurality of blocks, are matched with a deletable form according to a movement of the block;

delete the matched blocks when the matched blocks are directly adjacent to the mission block; and process the mission information for the mission block, wherein the processor-executable instructions to process the mission information are configured to:

change a color of the mission block to a color of the matched blocks when the matched blocks are deleted, and reduce a mission count when the color of the color-changed mission block corresponds to a color included in the mission information.

* * * * *